UNITED STATES PATENT OFFICE.

FRED. M. RUSCHHAUPT AND JNO. SCHULTE, OF NEW YORK, N. Y.

IMPROVED PERCUSSION-POWDER.

Specification forming part of Letters Patent No. 35,477, dated June 3, 1862.

*To all whom it may concern:*

Be it known that we, FREDERIC M. RUSCHHAUPT and JOHN SCHULTE, both in the city, county, and State of New York, have invented certain useful Improvements in Fulminating-Powder; and we do hereby declare that the following is a full and exact description thereof.

The nature of our invention consists in the production of an exploding powder which will produce the required effect without using fulminate of mercury, phosphorus, sulphur, or any poisonous or corrosive substance.

It is well known that the fulminate of mercury did produce many terrible accidents. We find it therefore not necessary to give here such statement about it. Yet we will remark here that persons being engaged in preparing or mixing this substance are constantly in danger, not only to be injured by an unpreventable explosion, but by the poisonous action of this substance on that part of the body with which it comes in contact. Such persons are commonly, after a short time, affected on the hands, nose, or eyes with sores. They become injured on their lungs, and are, lastly, wholly poisoned. They die or are ruined in health for life-time. Of a similar dangerous and poisonous character is the action of phosphorus. This body is otherwise of a corrosive nature. Thus when caps are filled with a powder containing it they soon will be blackened or corroded, which is caused by the chemical action of the phosphorus upon their metal. Such caps are therefore not very salable. After so many terrible accidents where these bodies did so remarkably show their dangerous properties, great efforts have been made to find a suitable substitute. It should be thought that in regard to the great number of explosive and inflammable materials such problem should be easily solved. Under such supposition many substances have been tried by capable and practical men for this purpose, but without a full or practical success. Thus, if we criticise the best and most powerful under their proposed substance—a mixture of chlorate of potash and sulphur, &c—we conceive that it must be of a very corrosive nature. Indeed, this powder soon blackens the caps, caused by chemical action of the sulphur upon their metal. The unpleasant odor which occurs by its explosion and the effective corrosive property of the sulphuric and sulphurous acid is a further cause why such caps did not come into public use. Other proposed substances—as gun-cotton or nitromanit, &c.— possess either the same corrosive property or such an inconstant nature that they soon change their chemical constitution. This consequently shows that difficulties are experienced which they could not avoid.

We overcome these difficulties in the object of our invention—namely, in the use of an exploding mixture consisting of chlorate of potash and tannin, or of chlorate of potash and pyrogallic acid, or of a mixture of chlorate of potash or any other analogous oxidizing agent with tannin or pyrogallic acid or a substance or substances analogous in physical and chemical properties to tannin or pyrogallic acid. These mixtures are made in accordance with the law of chemical affinity. They detonate easily and surely, producing a most perfect combustion accompanied with a light flame. They leave very little residue of a non-corrosive nature. Metals will not be affected by them, neither in their original state nor during their combustion, and the gases thus produced are of an agreeable flavor. They are not remarkably affected by dampness, and in consequence of the constant constitution of their components no decomposition can take place. It should then be by a considerable rise of temperature.

Resuming the advantages of this new proposed fulminating-powder, we state: It possesses all the ingredients which are justly required of it. It can be prepared or mixed with much less (or no) danger than a powder consisting of fulminate of mercury. It is of a non-poisonous character, and, lastly, cheaper than any powder containing the mentioned mercury combination.

To enable others to make and use our invention, we will now proceed to describe the *modus operandi.*

We take about seventy-five parts of powdered pure chlorate of potash and twenty-five parts of tannin, bring the same on a smooth sheet of paper, and mix it with a wooden knife. In order to prevent the mixture from dusting, and to make it fit for adhering in the caps, we add then from four to five per cent. of a compound varnish, consisting of a fluid solution of gum-shellac in alcohol and dammar in turpentine. Three-fifths of the first and two-fifths of the second will be a suitable proportion. The powder dries in a short time, and is then ready to be filled in the caps in the common way.

In some respects it may be useful to substitute a part of chlorate of potash by some or an equivalent weight of saltpeter or to mix from three to seven per cent. of well-dried prussiate of potash with it. By this, for instance, the price can be reduced; but it must hereby not be forgotten that at the same time the residue will be somewhat increased.

Naturally can this described powder be mixed in any proportion with other fulminating substances, whereby the great danger, corrosivity, &c., of them are considerably diminished.

Having now fully described our invention, we wish it distinctly understood that we do not claim the already described and used fulminates, nor do we claim the use of chlorate of potash, saltpeter, or any analogous oxidizing agent; but

What we claim, and desire to secure by Letters Patent, is—

The application of tannin and pyrogallic acid, or substances analogous in physical and chemical properties to them, in a manner as described, and for the purpose set forth.

FREDERIC M. RUSCHHAUPT
 JOHN SCHULTE.

Witnesses:
 H. SCHLARBAUM,
 Dr. WIESUKE.